United States Patent [19]
Carlsson et al.

[11] Patent Number: 5,970,408
[45] Date of Patent: Oct. 19, 1999

[54] COMMUNICATION CONTROL CIRCUITRY AND METHOD FOR A GROUP OF COMMONLY-MOVING MOBILE TRANSCEIVER UNITS

[75] Inventors: Göran Carlsson, Stenhamra; Marie Lambertsson, Solna, both of Sweden; Glen Schmid, Baie d'Urfe, Canada

[73] Assignee: Telefonaktiebolaget L/M Ericsson (publ), Stockholm, Sweden

[21] Appl. No.: 08/850,430

[22] Filed: May 2, 1997

[51] Int. Cl.[6] .............................. H04B 7/15; H04B 7/14; H04Q 7/00
[52] U.S. Cl. ...................... 455/439; 455/11.1; 455/20; 455/33.2; 455/432
[58] Field of Search ................................ 455/45, 66, 432, 455/435, 433, 431, 11.1, 20, 561, 562, 439, 56.1, 33.2, 15

[56] References Cited

U.S. PATENT DOCUMENTS

| | | | |
|---|---|---|---|
| 4,718,108 | 1/1988 | Davidson et al. | 455/17 |
| 5,384,824 | 1/1995 | Alvesalso | 379/59 |
| 5,408,515 | 4/1995 | Bhagat et al. | 379/59 |
| 5,519,761 | 5/1996 | Gilhousen | 379/59 |
| 5,559,865 | 9/1996 | Gilhousen | 379/60 |
| 5,603,080 | 2/1997 | Kallander et al. | 455/14 |

FOREIGN PATENT DOCUMENTS

| | | | |
|---|---|---|---|
| 2289191 | 11/1995 | United Kingdom | H04Q 7/38 |
| 9408406 | 4/1994 | WIPO | H04B 7/26 |
| 9602094 | 1/1996 | WIPO | H04B 7/185 |
| WO 96/14719 | 5/1996 | WIPO . | |
| WO 96/21999 | 7/1996 | WIPO . | |

OTHER PUBLICATIONS

Proceedings of the Vehicular Technology Conference, Stockholm, Sweden, Jun. 8, 1994, vol. 2, Institute of Electrical & Electronics Engineers,"Concept of a GSM–based Communication System for High–Speed Trains", Markus Uhlirz, pp. 1130–1134, XP000497595.

*Primary Examiner*—Wellington Chin
*Assistant Examiner*—Sheila Smith
*Attorney, Agent, or Firm*—Jenkens & Gilchrist, P.C.

[57] ABSTRACT

Control circuitry and an associated method for a modified-user, wireless communications system, such as a cellular communication system wherein groups of mobile transceiver units are positioned to travel together. Circuitry is positioned to travel together with the group of mobile transceiver units and to generate common control requests to control operation of the entire group of mobile transceiver units. When embodied in a cellular communication system, a common hand-off request is generated for the entire group of mobile transceiver units, obviating the need for each transceiver unit to independently generate a hand-off request. If a mobile transceiver is operable pursuant to an air interface standard dissimilar to a fixed-site transceiver with which communications are to be effectuated, a converter converts communication signals so that the communication signals can be communicated therebetween.

15 Claims, 8 Drawing Sheets

COMMUNICATION CONTROL CIRCUITRY AND METHOD FOR A GROUP OF COMMONLY-MOVING MOBILE TRANSCEIVER UNITS

TECHNICAL FIELD OF THE INVENTION

The present invention relates generally to wireless multi-user communication systems, such as a cellular communication system, having mobile transceiver units and a network infrastructure. More particularly, the present invention relates to circuitry, and an associated method, for facilitating communication between a group of mobile transceiver units positioned to move together, such as on a train or bus, and the network infrastructure.

Common control requests can be made for an entire group of the mobile transceiver units when the transceiver units are positioned to move together as a group. Loading problems which might otherwise occur if the transceiver units concurrently make independent control requests are avoided. In a cellular communication system, for instance, a plurality of users concurrently operating cellular phones on a mass transit device, such as a train or a bus, might overload the cellular system if independent control requests are concurrently made. Circuitry positioned to move together with the mass transit device makes control requests common to all of the cellular phones, avoids overloading of the cellular system.

BACKGROUND OF THE INVENTION

Utilization of multi-user, wireless communication systems to communicate telephonically has achieved wide popularity in recent years. Because a wireline connection is not required to effectuate telephonic communication, communication by way of a wireless communication system is possible at a location to which formation of wireline connection would be impractical or impossible.

Cellular communication systems having networks are exemplary of multi-user, wireless communication systems. Cellular communication networks, for instance, have been installed throughout significant portions of the world. Large numbers of subscribers to such cellular networks are able to communicate telephonically when positioned in areas encompassed by such cellular networks. Telephonic communication of both voice and data are permitted in such networks.

In a cellular communication system, fixed-site transceivers, referred to as base stations, are installed throughout a geographic region. Mobile transceivers, i.e., "cellular phones" or "subscriber units", positioned anywhere throughout the geographic area at which the base stations are installed, can communicate with at least one of the base stations. As a mobile transceiver travels through the geographic area, communication by the mobile unit is transferred, or "handed-off", to successive ones of the base stations. Continued communication by way of the mobile unit, without apparent interruption to the user is possible as the communication is handed-off between the successive ones of the base stations.

In some conventional, cellular systems, hand-offs are first initiated by a subscriber unit. The subscriber unit detects control signals generated upon selected control channels by the base stations. Comparisons are made at the subscriber unit between control signals received from various base stations. If communication between the subscriber unit and the cellular network by way of a first of the base stations is ongoing and the subscriber unit determines that communications can be better effectuated with the network by way of a another one of the base stations, the subscriber unit transmits a request that the ongoing communication be handed-off to the other base station.

Control circuitry, such as a mobile switching center, of the infrastructure of the cellular network typically controls the times in which a hand-off between two base stations is permitted. Responsive to the request transmitted by the subscriber unit, the control circuitry of the cellular network approves the hand-off, if such hand-off is possible.

If the hand-off request is approved, a channel at the other base station is allocated for communication with the subscriber unit, and instructions are sent to the subscriber unit instructing the subscriber unit to be re-tuned to the allocated channel. Communications by the subscriber unit thereafter continue with the cellular network by way of the succeeding base station. In such manner, ongoing communication is permitted without apparent interruption to the user of the subscriber unit.

Improvements in communication technologies have increased the convenience and affordability of usage of a cellular communication system. A concomitant increased number of users of the cellular communication systems increasingly utilize cellular communication systems to communicate therethrough. Other wireless communication systems have similarly exhibited increased usage. And usage of still other types of wireless communication systems is anticipated in the future.

Users, for instance, make use of cellular systems when positioned in motor vehicles. As many subscriber units are of sizes and weights permitting their carriage by a user, the subscriber units can be carried by a user and communication can be effectuated at any time. For instance, the user can communicate by way of the cellular system when positioned on a mass transit device.

When only a single user, or only a very small number of users, communicate pursuant to the cellular system while positioned on the mass transit vehicle, the additional loading to the cellular system is not significant. That is to say, when only a single or small number of users communicate by way of the cellular system when traveling together on the mass transit vehicle, only a single, or small number of, concurrent hand-off requests are made to the cellular network infrastructure as the mass transit vehicle upon which the user is situated travels through a geographic area.

However, when significant numbers of users positioned upon the mass transit vehicle utilize the cellular system, loading problems sometimes occur. Such loading problems can occur because the users situated on the mass transit vehicle are all positioned closely to one another to travel, together with travel of the mass transit vehicle, in the same direction, at the same speed, and at the same time.

Although each cellular phone is independently operable, all of the cellular phones receives the same, or similar, control signals from the base stations. And, even though each of the cellular phones is independently operable to determine when a hand-off request is made, because of the common positioning and movement of the cellular phones, each of the cellular phones substantially concurrently make hand-off requests to the cellular system network. Such concurrent requests can result in loading problems which might result in, e.g., inadvertent communication terminations.

Cellular communication systems have been constructed pursuant to various different cellular standards. The various different cellular standards are generally incompatible with one another. That is to say, a cellular phone operable pursuant to one cellular standard is typically unusable in a cellular communication system operable pursuant to a different one of the cellular standards. Some cellular phones, sometimes referred to as dual mode phones, have been constructed to permit their operation in two different cellular communication systems, such systems constructed pursuant two different cellular standards. However, the number of different cellular standards pursuant to which a cellular communication system might be constructed precludes, as a practical matter, the possibility that a portable, cellular phone might be constructed to permit its operation in every type of cellular communication system.

A cellular phone positioned upon a mass transit vehicle might be carried by the mass transit vehicle out of the geographic area encompassed by the cellular communication system in which it is operable and into a geographical area encompassed by a cellular communication system within which the cellular phone is incompatible. If communications are ongoing when the cellular phone passes beyond the coverage area of the cellular communication system in which the cellular phone is operable, communications are terminated. Communications are terminated even though communications would otherwise be possible if the cellular phone were operable pursuant to the cellular standard of the cellular communication system into whose coverage area the cellular phone travels. When a plurality of cellular phones are commonly carried upon a mass transit vehicle, numerous ongoing communications might be abruptly terminated as the mass transit vehicle carries the cellular phones out of the geographical area encompassed by one cellular communication system and into the geographical area encompassed by another cellular communication system.

A manner by which to reduce loading problems resulting when a plurality of users positioned to travel together at similar velocities during similar time periods would therefore be advantageous.

A manner by which to permit continued operation of a cellular phone as the cellular phone is carried out of a geographical area encompassed by one type of cellular communication system and into another type of cellular communication system would therefore also be advantageous.

It is in light of this background information related to multi-user communication systems, such as a cellular communication system, that the significant improvements of the present invention have evolved.

SUMMARY OF THE INVENTION

The present invention advantageously provides a manner by which to avoid loading problems in a multi-user communication system resulting when a plurality of mobile transceiver units are positioned together to travel at substantially similar velocities during substantially similar time periods. By avoiding such loading problems, undesired communication interruption or termination of on-going communications is less likely to occur.

Common control requests can be made for an entire group of the mobile transceiver units when the mobile transceiver units are positioned to move together as a group. Such common control requests are made in place of independent control requests generated by each of the mobile transceiver units. The number of control requests can be significantly reduced, and loading problems which might otherwise occur if the transceiver units concurrently make independent control requests are avoided.

In one embodiment, the present invention is operative in conjunction with a cellular communication system. A plurality of users, positioned to travel together, e.g., on a mass-transit device can concurrently communicate using mobile subscriber units by way of the cellular system without causing loading problems to the network infrastructure of the cellular system. When, e.g., the mass-transit device passes between cells defined by the network infrastructure, a hand-off request requesting hand-off of the mobile subscriber units being used by the users is generated. Responsive to the hand-off request common to all of the subscriber units, hand-offs of all of the subscriber units is effectuated. Generation of independent hand-off requests by each of the subscriber units is not required, and the loading problems associated with large numbers of subscriber units concurrently requesting hand-offs is avoided.

A control element, such as a mobile switching center, of the cellular network receives the indications of the common control request and, responsive thereto, causes the generation and transmission of signals to retune the cellular phones to effectuate the hand-off to another base station.

When the mass-transit vehicle is formed of a train or other vehicle which travels along a standard, or otherwise set, path, the base stations to which the ongoing communications should be handed-off may be quite simply determined. Because the vehicle travels along a standard path, once the direction of the vehicle is determined, successive ones of the base stations to which on-going communications should be handed-off can be readily ascertained. Particular ones of the base stations positioned in proximity to successive portions of the standard path to be taken by the mass-transit vehicle are known. Processing required of the control element of the cellular network can be further reduced as selection of successive ones of the base stations to which the on-going communications are handed-off, need not be determined, but rather, are predeterminable.

In another aspect of the present invention, communication circuitry, and an associated method, are provided for controlling communications between at least one mobile transceiver unit operable pursuant to a selected air interface standard and wireless communication network infrastructure having at least one first-system fixed-site transceiver unit operable pursuant to a first air interface standard and at least one second-system fixed-site transceiver unit operable pursuant to a second air interface standard. The mobile transceiver units are positioned to move together at a substantially similar velocity during a substantially similar time period. A local transceiver is positioned to move together with the at least one mobile transceiver unit. The local transceiver transceives local transceive signals with the at least one mobile transceiver unit. A macro-system transceiver is positioned to move together with the at least one mobile transceiver unit. The macro-system transceiver transceives macro-system transceiver signals with a selected one of the first-system, fixed-site transceiver unit and the second-system, fixed-site transceiver unit. A converter is coupled to the local transceiver and to the macro-system transceiver. The converter selectively converts the local transceive signals and the macro-system transceive signals. The converter selectively converts the signals such that the local transceive signals communicated by the local transceiver to the at least one mobile terminal are communicated pursuant to the selected air interface standard. And, the macro-system transceive signals communicated by the macro-system transceiver to a respective one of the first-system, fixed-site transceiver unit and the second-system, fixed-site transceiver unit is a corresponding respective one of the first interface standard and the second interface standard.

In these and other aspects, therefore, communications circuitry, and an associated method, controls communications between a group of mobile transceiver units and a wireless communication network infrastructure. The infrastructure has at least a first fixed-site transceiver unit and a second fixed-site transceiver unit. Each of the subscriber units is positioned to move together at substantially similar velocities during substantially similar time periods. A receiver is positioned to move together with the group of mobile transceiver units. The receiver is tunable to receive infrastructure-generated control signals transmitted by the at least first and second fixed-site transceiver units. A determiner is coupled to receive indications of the infrastructure-generated control signals received by the receiver. The determiner determines between which of the at least first and second fixed-site transceiver units communications with the group of transceiver units are best able to be effectuated. Fixed-site allocation request signals are generated responsive thereto. A transmitter is positioned to move together with the group of mobile transceiver units and is coupled to receive the fixed-site allocation request signals generated by the determiner. The transmitter transmits the fixed-site allocation request signals to the wireless communication network infrastructure to request allocation of a particular one of the at least first and second fixed-site transceivers to which to effectuate the communications between the group of mobile transceiver units and the wireless communication network infrastructure.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
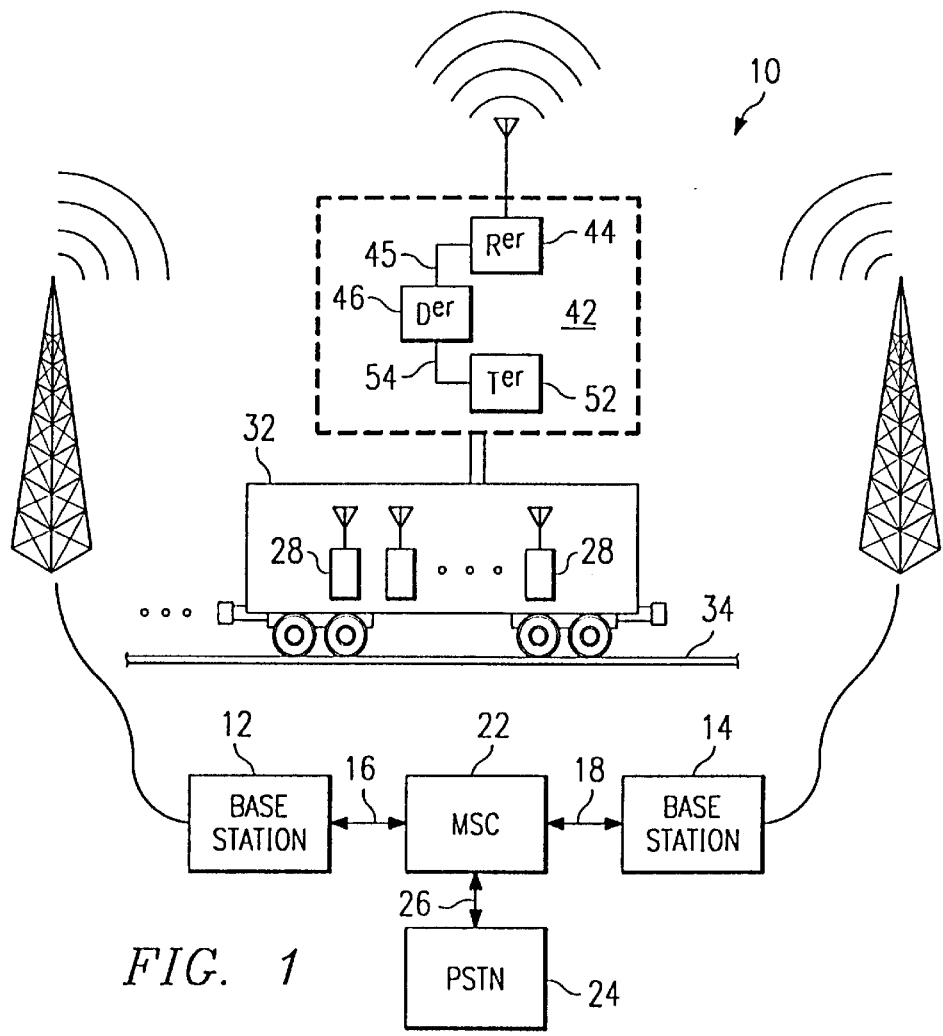
FIG. 1 illustrates a partial schematic, partial functional block diagram of a communication system in which an embodiment of the present invention is operative.

Turning first to FIG. 1, a communication system, shown generally at 10, in which an embodiment of the present invention is operative, is illustrated. The communication system 10 is here shown to be a cellular communication system; other types of wireless communication systems can be similarly illustrated.

Two base stations 12 and 14 of the fixed network infrastructure of the cellular communication system are illustrated in the Figure. Each of the base stations 12 and 14 define cells of the cellular communication system, in conventional manner. The base stations 12 and 14 each include transceiver circuitry operative to transmit and to receive radio frequency, communication signals. Only two base stations of the fixed network infrastructure of the cellular communication system are shown in the Figure for purposes of simplicity. In an actual cellular communication system, of course, the fixed network infrastructure is typically formed of a large number of spaced-apart base stations, each defining one or more cells.

The base stations 12 and 14 are coupled, here shown by way of lines 16 and 18, respectively, to a mobile switching center 22. The mobile switching center 22 is operative, inter alia, to control operation of the base stations 12 and 14. The switching center 22 is further coupled to a public service telephonic network (PSTN) 24 by way of lines 26, in conventional fashion.

The communication system 10 is further shown to include a plurality of mobile subscriber units 28, each of which is positioned to be movable together with movement of a mass-transit device, here a train 32. The mobile subscriber units 28 may, for example, be carried by users thereof onto the train 32 to permit the users of the subscriber units to communicate via the cellular communication system as the train 32 travels along a route defined by the tracks 34 upon which the train is positioned.

As the train 32 travels along the tracks 34, the mobile subscriber units 28 pass between cells defined by the base stations 12 and 14. As the subscriber units 28 are all positioned to travel together with travel of the train 32, all of the subscriber units 28 travel in the same direction, at the same speed, during the same time period.

As mentioned previously, because of such common movement, the subscriber units, although acting independently, generate hand-off requests at substantially the same times. Because of the commonality of positioning of the subscriber units 28 at the train 32, the transceiver units 28 typically all communicate with the same base station, such as base station 12, of the fixed network infrastructure when the train 32 at which the subscriber units are positioned is located within the cell defined by that base station.

As the train 32 travels along the tracks 34 such that the train 32 travels beyond the cell defined by the base station 12 and into the cell defined by the base station 14, all of the transceiver units 28 are transported out of the cell defined by the base station 12 and into the cell defined by the base station 14.

In conventional operation, each subscriber unit 28 independently determines that communications between the subscriber unit and the fixed network infrastructure of the cellular system should be handed-off from the base station 12 to the base station 14. Hand-off requests are generated by each of the subscriber units 28 substantially concurrently due to the commonality of positioning of such subscriber units. When the fixed network infrastructure of the cellular system receives a large number of hand-off requests at substantially the same time, overloading of the fixed network infrastructure can result. When overloaded, system misoperation might occur resulting in, for instance, inadvertent communication termination of some of the subscriber units.

Circuitry 42 of an embodiment of the present invention is positioned to travel together with travel of the train 32 at which the subscriber units 28 are positioned. The circuitry 42 generates a common hand-off request requesting communication hand-offs for all of the subscriber units 28 positioned at the train 32 to be carried therewith. As a common hand-off request effectuates hand-offs of all of the subscriber units 28; if the common hand-off request is generated and the hand-offs are effectuated in a timely manner, hand-off requests are not independently generated by each of the subscriber units. And overloading of the fixed network infrastructure of the cellular system does not occur.

The circuitry 42, in the embodiment illustrated in the Figure, includes a receiver 44 for receiving control signals generated, for example, upon control channels defined in the cellular system. The receiver 44 is more sensitive than the receiver circuitry forming portions of the subscriber units 28. Because of such greater sensitivity, the control signals generated by the base stations are first detected by the receiver 44, and operations responsive thereto can be earlier responded to by the circuitry 42. If the hand-offs of the subscriber units 28 are effectuated responsive to the common hand-off request prior to operation of the receiver circuitry of the individual ones of the subscriber units, the individual subscriber units will not separately generate hand-off requests.

The receiver 44 of the circuitry 42 is coupled to a determiner 46 which also forms a portion of the circuitry 42. The determiner 46 is operative responsive to the signals received by the receiver 44 to determine whether a common hand-off request should be generated. The determiner is coupled to the receiver 44 by way of lines 45 to receive indications of the signals received by the receiver 44.

When the determiner 46 determines that a hand-off from one base station to another base station of the fixed network infrastructure should be effectuated, the determiner causes a transmitter 52, which also forms a portion of the circuitry 42, to transmit a common hand-off request to be transmitted to the fixed network infrastructure of the cellular system. The transmitter 52 is coupled to the determiner 46 by way of lines 54 to receive indications of times determined by the determiner in which a hand-off should be requested.

The common hand-off request generated by the transmitter 52 and received at the fixed network infrastructure is applied to the mobile switching center 22 thereof. Determinations are made at the mobile switching center 22 as to whether a hand-off should be effectuated responsive to the hand-off request.

The receiver 44 of the circuitry 42 is further operative to scan the communication channels, such as voice channels, upon which communication signals are transmitted between the subscriber units 28 and the fixed network infrastructure of the cellular system. Indications of the channels upon which communications are ongoing between the subscriber units 28 and the fixed network infrastructure are also transmitted by the transmitter 52 of the circuitry 42 to the fixed network infrastructure. Such indications are then provided to the mobile switching center 22.

When a decision is made to hand-off communications from one base station to another base station of the fixed network infrastructure of the cellular system, the mobile switching center allocates the channels to which the subscriber units 28 are to be re-tuned, informs the selected base station of the hand-offs, and causes control signals to be transmitted to the individual ones of the subscriber units to cause re-tuning of the subscriber units to the newly-allocated channels.

The circuitry 42 is thereby operative to initiate effectuation of hand-offs of all of the subscriber units 28 positioned to travel together with travel of the train 32 by generating a common hand-off request. When the fixed network infrastructure of the cellular system detects the transmission of the common hand-off request, control signals are transmitted to the individual ones of the subscriber units 28 to re-tune the subscriber units, thereby to effectuate the hand-offs of the subscriber units. Because hand-off requests are not generated by each of the subscriber units 28, but, rather, a common, hand-off request is generated by the circuitry 42, overloading all the fixed network infrastructure of the cellular system is unlikely to occur.

Figure 2:
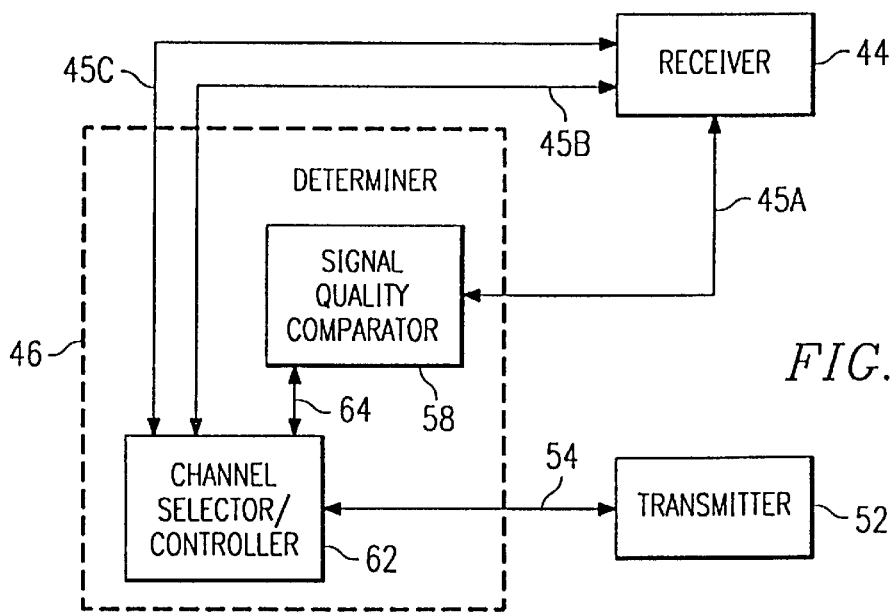
FIG. 2 illustrates a functional diagram of the communication circuitry of an embodiment of the present invention.

The circuitry 42 is again illustrated in FIG. 2. The circuitry 42 is again shown to include a receiver 44, a determiner 46, and a transmitter 52. In the illustration of FIG. 2, the determiner 46 is shown to include a signal quality comparator 58 coupled by way of a line 45A to the receiver 44. The signal quality comparator 58 is operative to compare the signal qualities of control signals transmitted by the base stations of the fixed network infrastructure. In one embodiment, the signal strengths are compared by the comparator; in another embodiment, bit error rates of the received signals are compared by the comparator.

The receiver 44 is also coupled to a channel selector/controller 62 by way of a line 45B. The channel selector/controller 62 selects the channels upon which the receiver 44 is tuned. By appropriate selection of the channels to which the receiver 44 is tuned, the signals applied to the signal quality comparator 58 by way of line 45A permit the signal quality comparator to compare signals generated by selected base stations on selected control channels.

Results of the comparisons compared by the comparator 58 are applied by way of line 64 to the channel selector/controller. The channel selector/controller determines whether to permit the generation of a common hand-off request responsive to the values of the signals generated by the signal quality comparator. If a common hand-off request is to be generated, the selector/controller generates signals on the line 54 to cause the transmitter 52 to transmit the common hand-off request back to the fixed network infrastructure.

The selector/controller 62 is further operative to tune the receiver 44 to channels upon which communication signals can be transmitted between the subscriber units, such as the subscriber units 28 shown in FIG. 1, and the fixed network infrastructure of the cellular system. Indications of signals received by the receiver 44 when turned to such channels are provided to the selector/controller 62 by way of line 45C.

The selector/controller 62 is further operative responsive thereto to provide indications of the channels upon which communication signals are being transmitted, on the line 54 to the transmitter 52. The transmitter 52 transmits signals representative of such indications back to the fixed network infrastructure.

While the circuitry 42 can be used in conjunction with almost any movable platform assembly at which subscriber units can be positioned, when the circuitry 42 is mounted at a train or other type of device which travels along a standard or set route, determinations as to which of the base stations that the ongoing communications should be handed-off is simplified.

Figure 3:
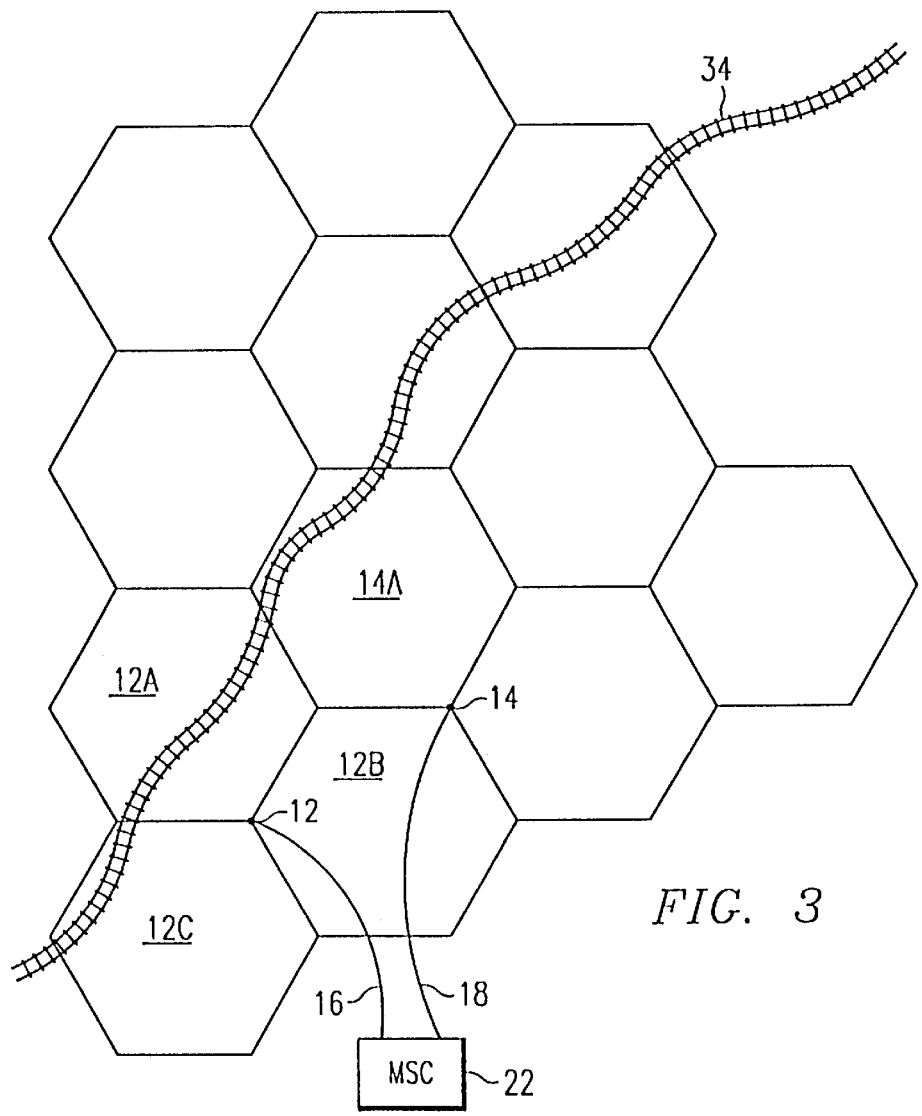
FIG. 3 illustrates a representation of an exemplary cell structure of a cellular communication system and a transportation path which extends through the geographic area defined by the cells of the cellular system.

FIG. 3 illustrates a plurality of the cells defined by the communication system 10, shown in FIG. 1. Cells defined by the base stations 12 and 14, designated by 12A, 12B, 12C, 14A, 14B, and 14C, respectively, are indicated in the Figure. And, the tracks 34 upon which the train 32 (shown in FIG. 1) travels is also indicated in the Figure.

Because the tracks 34 define a standard route of travel of the train 32 from which the train does not deviate, once the position and direction of travel of the train 32 is determined, when a hand-off request is generated by the circuitry 42 positioned to travel together with the train, the base station to which ongoing communications should be handed-off is predeterminable.

That is to say, the mobile switching center 22, or other control circuitry of the fixed network infrastructure, need not determine the base station to which the ongoing communications should be handed-off. Rather, a memory storage device at the mobile switching center 22 can store data indicative of to which of the base stations a hand-off should be effectuated. Channel allocations to the selected base station to permit ongoing communications are supplied to the selected base station and to the subscriber units in which ongoing communications are to be handed-off.

Figure 4:
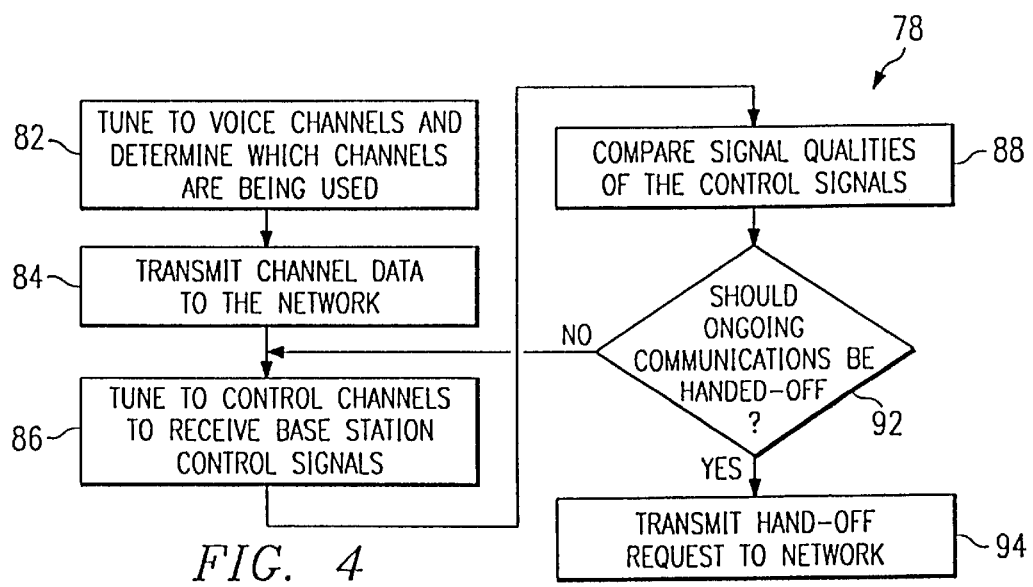
FIG. 4 illustrates a logical flow diagram illustrating the method of operation of the circuitry shown in FIG. 2 according to an embodiment of the present invention.

FIG. 4 illustrates a method, shown generally at 78 which illustrates the method of operation of the circuitry 42, shown in FIGS. 1 and 2, of an embodiment of the present invention. The circuitry 42 is operative to generate signals representative of the communications channels utilized by the subscriber units 28 (shown in FIG. 1) in on-going communications with the fixed network infrastructure and to transmit common hand-off requests to the fixed network infrastructure.

First, and as a indicated by the block 82, the receiver of the circuitry is tuned to the communication channels upon which communications between the subscriber units and the fixed network infrastructure might be generated. Determinations are made as to which of the channels are being utilized by the subscriber units in on-going communications.

Then, and as indicated by the block 84, data indicative of which of the communication channels are being used by the various subscriber units are transmitted to the fixed network infrastructure. The data is transmitted to the fixed network infrastructure of the cellular system by the transmitter of the circuitry 42.

Next, and as indicated by the block 86, the receiver of the circuitry 42 is tuned to control channels to receive base station control signals generated by selected base stations of the cellular system. Signal qualities of the received signals are compared, as indicated by the block 88.

Responsive to the comparisons, a determination is made, as indicated by the decision block 92, as to whether on-going communications should be handed-off. If not, the no branch is taken back to block 86 and the control signals are continued to be monitored. If, however, a determination is made that on-going communications should be handed-off, the yes branch is taken to block 94, and the transmitter of the circuitry 42 transmits a hand-off request to the fixed network infrastructure requesting that all of the subscriber units be handed-off to another base station.

Figure 5:
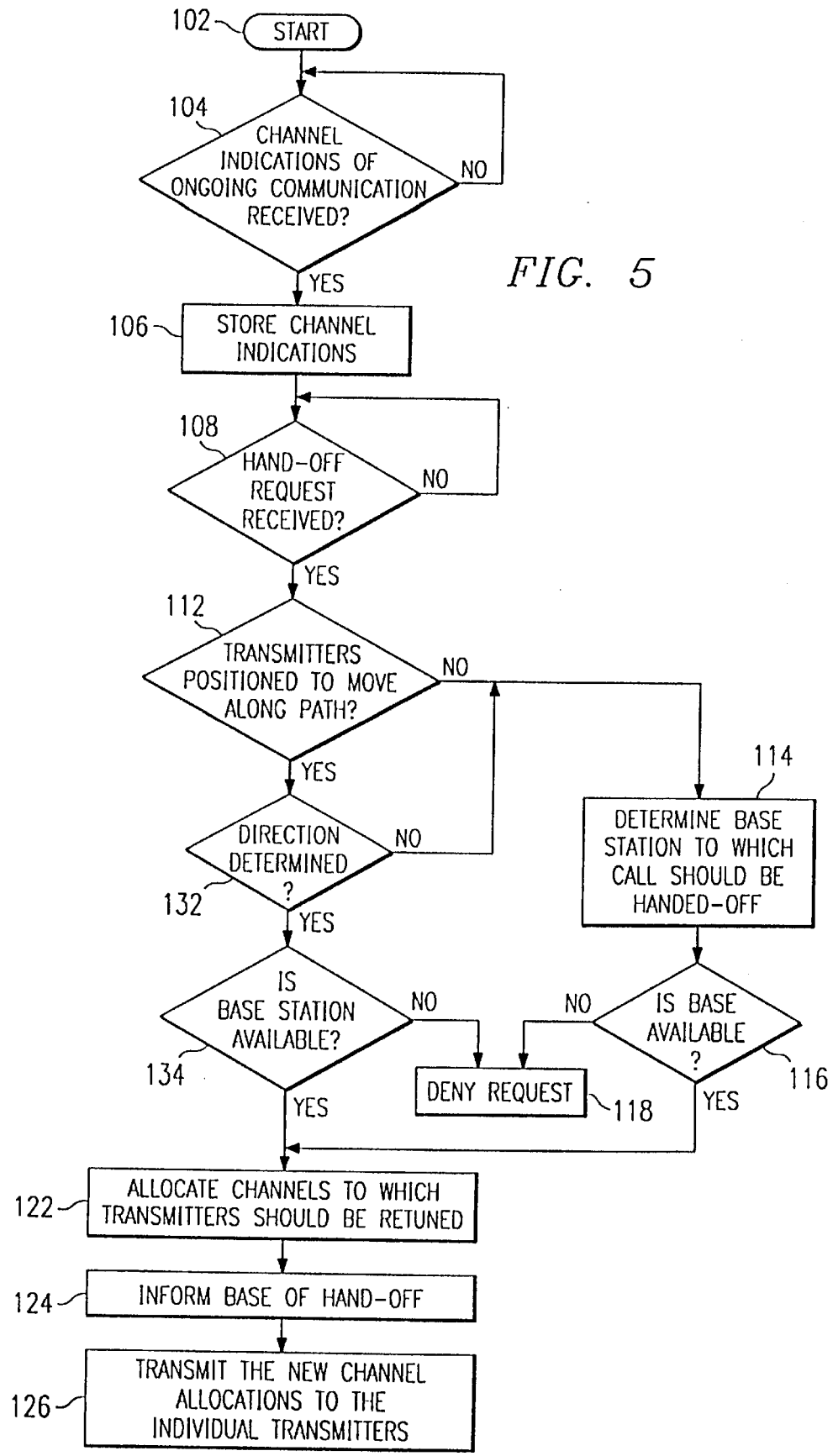
FIG. 5 illustrates a logical flow diagram which illustrates the method of operation of network control circuitry during operation of an embodiment of the present invention.

FIG. 5 illustrates a method, shown generally at 98, representative of exemplary operation of circuitry of a mobile switching center, such as the mobile switching center 22 shown in preceding Figures, or other control circuitry of a cellular communication system responsive to signals transmitted to the network by the circuitry 42.

First, and after entry, as indicated by the start block 102, a determination is made as to whether the channel indications of on-going communication have been received at the fixed network infrastructure. If not, the no branch is taken and monitoring for reception of such indications continues. If, conversely, such indications are received at the cellular system infrastructure, the yes branch is taken from a block 104 to block 106 and such data is stored by the mobile switching center.

Thereafter, and as indicated by the decision block 108, a determination is made as to whether a hand-off request generated by the circuitry 42 has been received. If not, the no branch is taken and monitoring continues. If, conversely, a request for common hand-off of all the subscriber units is received, the yes branch is taken to the decision block 112 and a determination is made as to whether the subscriber units are positioned to move along a standard, or other set, path.

If not, the no branch is taken to the block 114 whereat a determination is made as to which base station to which on-going communication should be handed-off. Thereafter, a determination is made, as indicated by the decision block 116 as to whether the selected base station is available. If not, the no branch is taken to block 118 and the request for a hand-off is denied. If the base station is available, the yes branch is taken to the block 122, and channels to which the subscriber unit should be re-tuned to effectuate a hand-off are allocated.

Then, as indicated by the block 124, the selected base station is informed of the channel allocations, and the channel allocations are transmitted to the individual subscriber units, as indicated by the block 126.

If the determination made at the decision block 112 indicates that the subscriber units are positioned to move along a standard path, the yes branch is taken to the decision block 132 whereat a determination is made as to whether the direction of movement of the subscriber unit along the standard path has been determined. If not, the no branch is taken to the block 114; otherwise, the yes branch is taken to the decision block 134 whereat a determination is made as to whether the predetermined base station stored at the mobile switching center is available. If not, the no branch is taken from the decision block 134 and the request for hand-off is denied. If however, the predetermined base station is available, the yes branch is taken to the blocks 122, 124, and 126, as described above. In such manner, a hand-off request generated at the circuitry 42 can be effectuated for all of the subscriber units positioned to travel together with the circuitry 42.

A hand-off request common to all the subscriber units positioned to travel together with the circuitry 42 initiates effectuation of hand-offs of all of the subscriber units. Hand-off requests need not be generated by individual ones of the subscriber units to effectuate hand-offs. Because the common hand-off request is generated, loading problems which might otherwise occur if the subscriber units concurrently make independent hand-off requests are avoided. Inadvertent call termination or disruption resulting from overloading of infrastructure of the cellular system is less likely to occur and users of the cellular communications system are able to communicate by way of the cellular system while positioned to travel together on, for example, a mass transit device.

Figure 6:
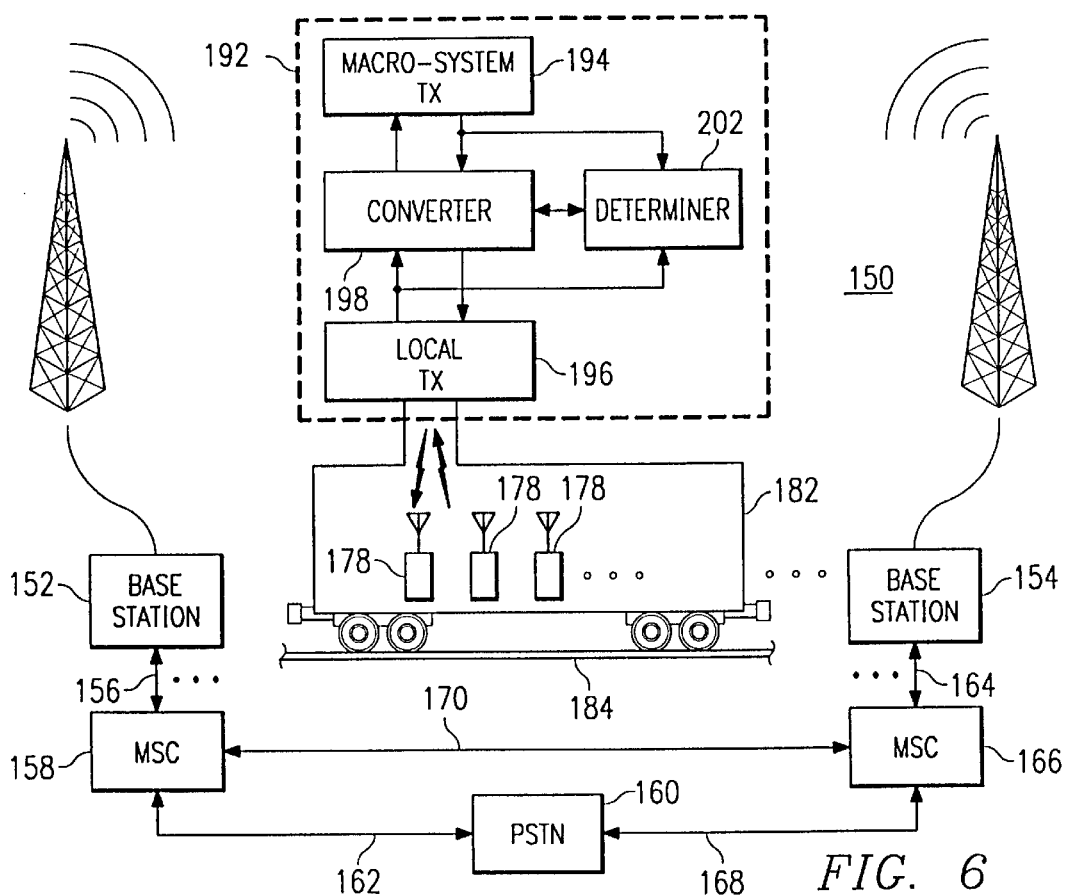
FIG. 6 illustrates a partial schematic, partial functional block diagram of a communication system in which another embodiment of the present invention is operative.

Turning next to FIG. 6, a communication system, shown generally at 150, in which another embodiment of the present invention is operative, is illustrated. The communication system 150 is here formed of two separate cellular communication systems. Viz., the system is formed of a first part and a second part. The first part is a cellular communication system constructed pursuant to a first air interface standard. And, the second part is a cellular communication system constructed pursuant to a second air interface standard. Other types of wireless communication systems can be similarly illustrated.

A base station 152 of the wireless network infrastructure of a first cellular communication system and a base station 154 forming a portion of the wireless network infrastructure of a second cellular communication system are illustrated in the Figure. While not shown, the first and second cellular communication systems include other base stations similar to the base stations 152 and 154, respectively.

Each of the base stations 152 and 154 define cells of their respective cellular communication systems, in conventional manner. The base stations 152 and 154 each include transceiver circuitry operative to transmit and to receive communication signals formed pursuant to the respective air interface standards of the cellular communication systems.

The base station 152 is coupled, by way of the line 156, to a MSC (mobile switching center) 158 of the first cellular communication system. The MSC 158 is operable in conventional manner, inter alia, to control the operation of the base stations, such as the base station 152, to which the MSC 158 is coupled. The MSC 158 is further coupled to a PSTN (public switched telephonic network) 160, here by way of the lines 162, also in conventional manner.

The base station 154 is coupled, here shown by way of the line 164, to a MSC (mobile switching center) 166 of the second cellular communication system. While not separately shown, the MSC 166 is also coupled to other base stations similar to the base station 154. The MSC 166 is operable, inter alia, to control operation of such base stations. The MSC 166 is further coupled to the PSTN 160 by way of the lines 168, again in conventional fashion. And, the MSCs 158 and 166 of the two different cellular communication systems are functionally coupled together, here indicated by the line 170.

The communication system 150 is further shown to include a plurality of mobile subscriber units 178, each of which is positioned to be movable together with movement of a mass-transit device, here a train 182. The mobile subscriber units 178 may, for example, be carried by users thereof onto the train 182 to permit the users of the subscriber units to communicate via one of the communication systems as the train 182 travels along a route defined by the tracks 184 upon which the train is positioned. In one embodiment, the compartment of the train 182 forms a Faraday's cage for preventing emanation of electromagnetic energy into or out of the compartment. Conventional shielding material may, for instance, be placed over the non-metallic, e.g., window, portions of the compartment.

As the train 182 travels along the tracks 184, the mobile subscriber units 178 travel out of the geographical area encompassed by the base station 152 of the first cellular communication system and into the geographical area encompassed by the base station 154 of the second cellular communication system. As the subscriber units 178 are all positioned to travel together with travel of the train 182, all of the subscriber units 178 travel in the same direction, at the same speed, during the same time period.

As mentioned previously, a cellular subscriber unit operable pursuant to the air interface standard of one cellular communication system is typically not operable pursuant to the air interface standard of another cellular communication system. A cellular subscriber unit 178 operable pursuant to the air interface standard of the cellular communication system of which the base station 152 forms a portion shall typically not be able to communicate with a base station, such as the base station 154 of the second cellular communication system. If all of the subscriber units 178 are of similar constructions, all ongoing communications between such subscriber units 178 and the base station 152 are terminated when the train 182 travels beyond the geographical area encompassed by the cellular communication system of which the base station 152 forms a portion.

Circuitry 192 of an embodiment of the present invention is positioned to travel together with travel of the train 182 at which the subscriber units 178 are positioned. The circuitry 192 permits communication of the subscriber units 178 with the base stations, such as the base stations 152 and 154, of the two cellular communication systems even though the cellular subscriber units 178 are not operable independently to communicate pursuant to the air interface standards of both of the two communication systems.

The circuitry 192 is shown to include a macro-system transceiver 194 operable to transceive macro-system uplink and downlink signals with the base stations, such as the base stations 152 and 154, of the two separate cellular communication systems.

The circuitry 192 further includes a local transceiver 196 operable to transceive local uplink and downlink signals with the cellular subscriber units 178. The local transceiver is operable pursuant to the same air interface standard (or standards) pursuant to which the subscriber units 178 are operable.

The circuitry 192 further includes a converter 198, coupled both to the macro-system transceiver 194 and local transceiver 196. The converter 198 is operable to selectively convert characteristics of signals provided thereto by the macro-system transceiver 194 and the local transceiver 196.

Namely, the converter 198 is operable to convert signals provided thereto into forms complying with the appropriate air interface standards pursuant to which the intended destinations, i.e., base stations 152 and 154 and mobile terminals 178 of such signals are operable. For instance, in exemplary operation of the system 150, downlink signals generated and transmitted by the base station 152 are formed pursuant to a first air interface standard. And, the cellular subscriber units 178 are operable pursuant to the first air interface standard. Because the downlink signals that are transmitted to the transceiver 194 are formed pursuant to the air interface standard pursuant to which the units 178 are also operable, the converter 198 need not convert the downlink signals but merely forwards the signals on to the transceiver 196. The local transceiver 196 generates local downlink signals which are communicated to the appropriate subscriber units 178. Analogously, uplink signals generated by the subscriber units 178 need not be converted by the converter 198. Rather, the macro-system transceiver 194 forwards such signals on to the base station 152.

Downlink signals generated by the base station 154 are formed pursuant to a second cellular air interface standard. When the train 182 is positioned within the geographical area encompassed by the cellular communication system of which the base station 154 forms a portion, the downlink signal generated by the base station 154 and transmitted to the transceiver 194 must be converted by the converter 198 into forms pursuant to the first air interface standard. Once converted, the local transceiver 196 forwards on the local downlink signals pursuant to the first air interface standard. Analogously, local uplink signals generated by the subscriber units 178 are formed pursuant to the first air interface standard. Such signals are converted by the converter 198 to a form to permit their transmission by the macro-system transceiver 194 pursuant to the second air interface standard. Thereby, two-way communication is permitted between the subscriber units 178 and the base station 154.

More generally, the subscriber units 178 may be operable pursuant to different air interface standards. Viz., one subscriber unit 178 might be operable pursuant to a first air interface standard. A second subscriber unit 178 might be operable pursuant to a second air interface standard, while a third subscriber unit 178 might be operable pursuant to a third standard, etc. And, the converter 198 is operable to selectively convert the signals generated by selected ones of the subscriber units 178 and not the signals generated by others of the subscriber units. Conversion of the signals is dependent upon whether conversion is required for suitable detection at the destination, (i.e., base station) of the signals. Conversely, downlink signals generated by the base stations 152 and 154 are selectively converted, dependent upon to which of the subscriber units 178 the downlink signals are to be communicated.

The circuitry 192 further includes a determiner 202, here coupled to the macro-system transceiver 194, the local transceiver 196, and the converter 198. The determiner 202 is operable, in part, in manners analogous to the determiner 46 shown in previous Figures. The determiner 202 is operable to determine when a common hand-off request for the subscriber units 178 should be requested, either between successive base stations of one of the cellular communication systems, or between the cellular communication systems. Determinations are, in the exemplary embodiment, also made responsive to, e.g., indications of signal strength levels of control signals generated by the respective base stations. Details of the operation of the determiner 202 are analogous to those described with respect to the determiner 46 and shall not again be described in detail.

In the exemplary embodiment, the determiner 202 is also operable to determine the signal types of the signals received from the subscriber units 178 and the base stations 152 and 154. Viz., the determiner determines the air interface standards pursuant to which the local uplink signals and the macro-system downlink signals are formed. Determinations made by the determiner 202 are provided to the converter 198.

The functionality of the converter 198 and determiner 202 are embodied with a switching device, here indicated by the block 204, shown in dash. A VLR (visited location register) 206, operable in conventional fashion, is also shown in the Figure.

Figure 7:
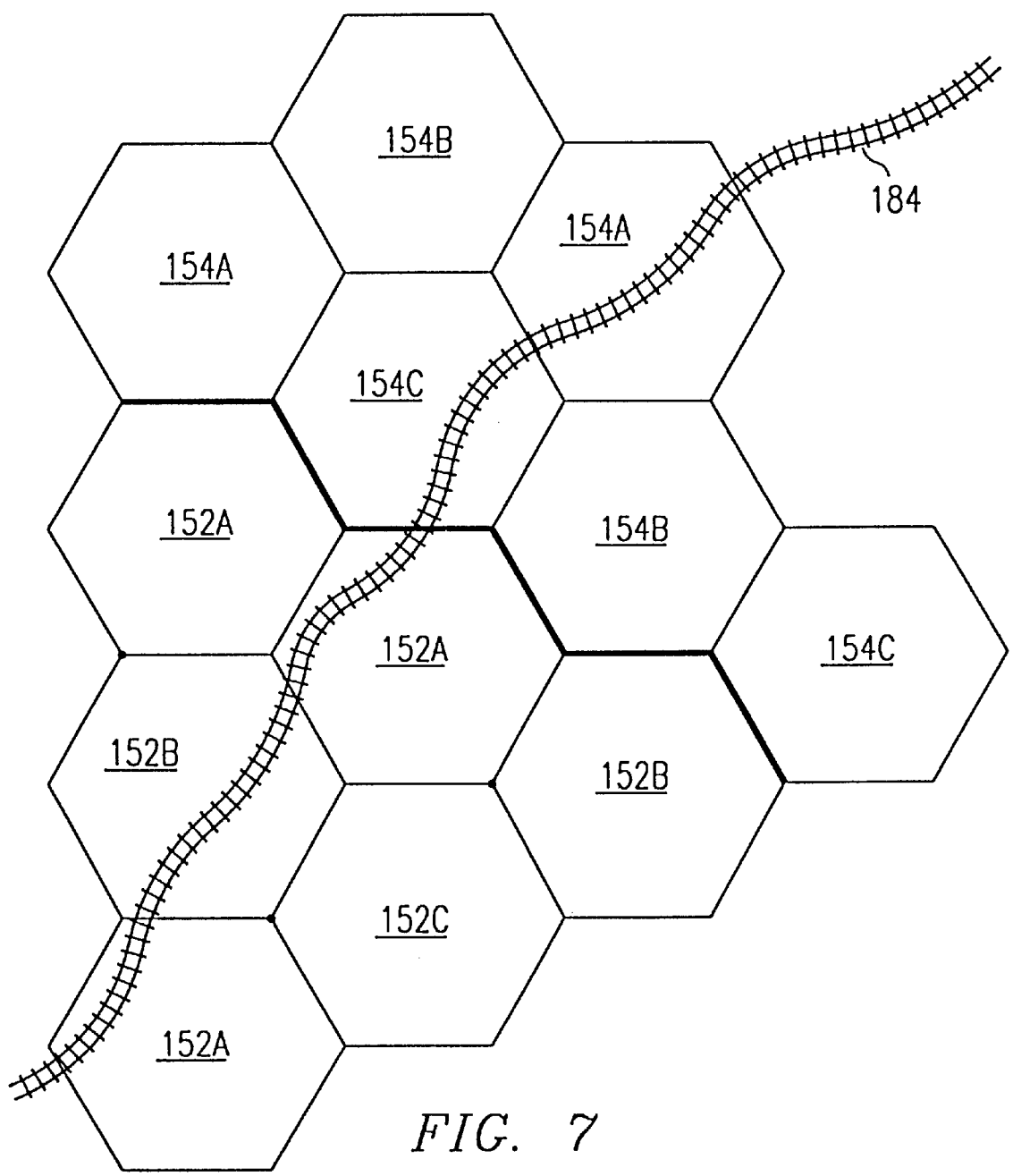
FIG. 7 illustrates a representation of exemplary cell structures of two cellular communication systems and a transportation path which extends through the geographic area defined by the cellular communication systems.

FIG. 7 illustrates a plurality of cells defined by base stations 152 and base stations 154 of the first and second cellular communication systems. Cells defined by the base stations 152 are designated by the reference numerals 152A, 152B, and 152C in the Figure. And, cells defined by the base stations 154 are indicated by reference numerals 154A, 154B, and 154C in the Figure. The tracks 184 upon which the train 182 (shown in FIG. 6) travels is also indicated in the Figure. As illustrated, the tracks extend between cells of the first cellular communication system and cells of the second cellular communication system.

When the train 182 is positioned in a geographical area encompassed by the cells 152A–C of the first cellular communication system, uplink signals generated by the macro-system transceiver 194 are of characteristics which comply with the requirements of the air interface standards pursuant to which the first cellular communication system is operable. And, when the train 182 is positioned within the geographical area encompassed by the cells 154A–C of the second cellular communication system, the uplink signals generated by the macro-system transceiver 194 are of characteristics which comply with the requirements of the air interface standard pursuant to which the second cellular communication system is constructed.

The converter 198 is operable selectively to convert the characteristics of the signals provided to the macro-system transceiver 194 and the local transceiver 196 so that the communication signals communicated to the base stations and cellular subscriber units are all of characteristics permitting the communication signals communicated to such destinations to be formed pursuant to the appropriate air interface standards.

Figure 8:
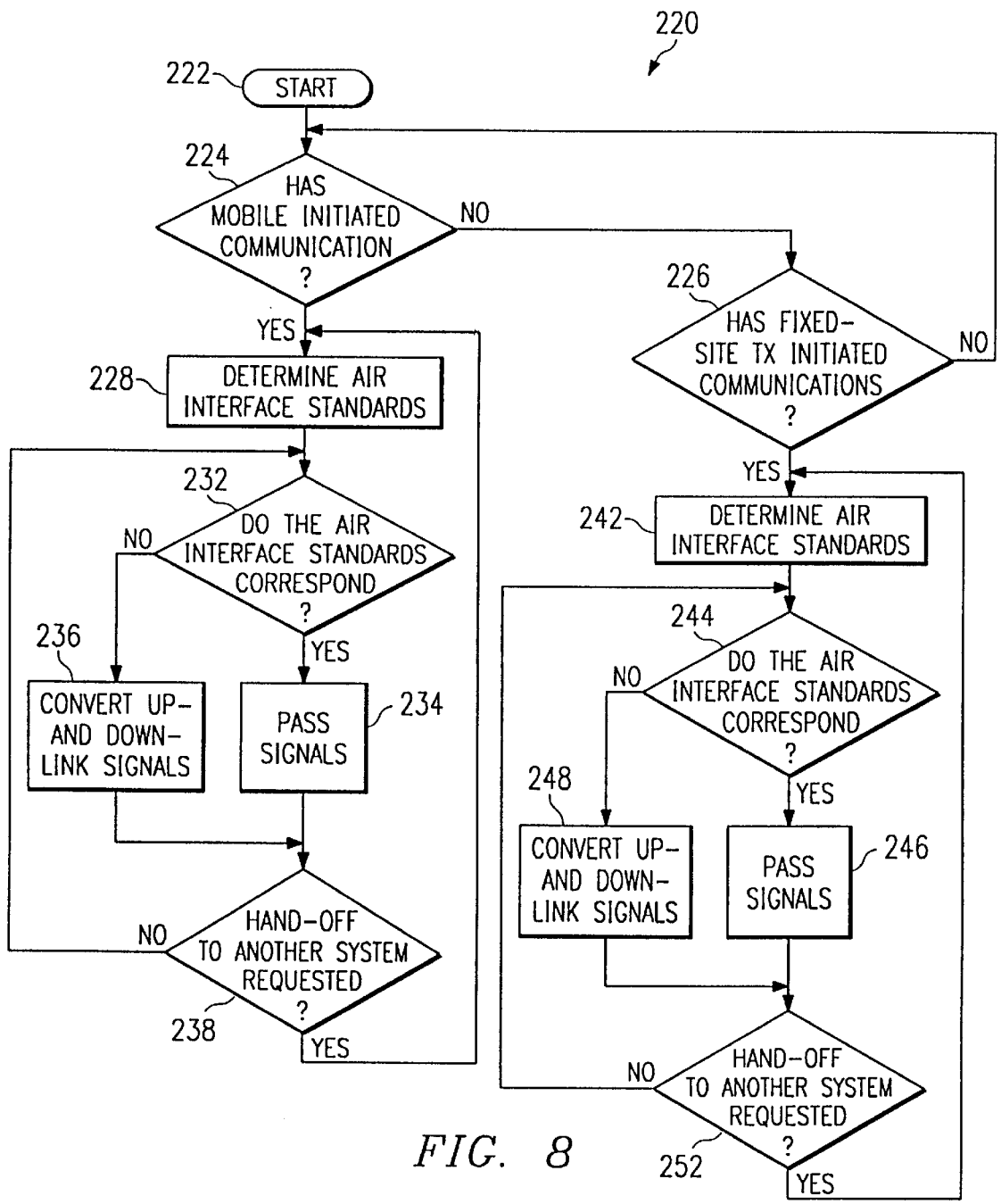
FIG. 8 illustrates a logical flow diagram illustrating the method of operation of another embodiment of the present invention.

FIG. 8 illustrates a method, shown generally at 220, of an embodiment of the present invention. The method is operable to effectuate communications of communication signals transmitted between a mobile terminal and a base station. The mobile terminal and the base station are not necessarily constructed pursuant to the same air interface standards.

After entry, indicated by the start block 222, a determination is made, such as by the determiner 202 (shown in FIG. 6), at the decision block 224 as to whether the mobile terminal has initiated communication. If not, the no branch is taken to the decision block 226 whereat a determination is made as to whether a fixed-site transceiver has initiated communications. If not, the no branch is taken back to the decision block 224.

If, conversely, the mobile terminal has initiated communications, the yes branch is taken from the decision block 224 to the block 228 whereat a determination is made, such as by the determiner 202 (shown in FIG. 6), of the air interface standards pursuant to which communications between the mobile terminal and the fixed-site transceiver are to be effectuated. Thereafter, and as indicated by the decision block 232, a determination is made as to whether the air interface standard pursuant to which the mobile terminal is operable and the air interface standard pursuant to which the fixed-site transceiver is operable correspond. If so, the yes branch is taken to the block 234 whereat communication signals are passed between mobile terminal and the fixed-site transceiver. If, however, the air interface standards are determined at the decision block 232 not to correspond, the no branch is taken to the block 236 whereat conversions of the communication signals are made, such as by the converter 198 (shown in FIG. 6), such that the destination stations, both the mobile terminal and the fixed-site transceiver, are able to receive the signals transmitted thereto.

Thereafter, a determination is made at the decision block 238 as to whether a handover to another system is requested. If so, the yes branch is taken back to the block 228. Otherwise, the no branch is taken back to the decision block 238.

If the yes branch is taken from the decision block 226 to the block 242, determinations are made as pursuant to which of the air interface standards the mobile terminal and the fixed-site transceiver are operable. Thereafter, and as indicated by the decision block 244, a determination is made as to whether the air interface standards of the mobile terminal and the fixed-site transceiver correspond. If so, the yes branch is taken to the block 246 and communication signals are passed as communications can be effectuated between the mobile terminal and the fixed-site transceiver without converting the signals. If, conversely, the air interface standards are determined not to correspond, the no branch is taken to the block 248 whereat the communication signals are converted so that the destination devices are able to receive the communication signals transmitted thereto.

Thereafter, and as indicated by the decision block 252, a determination is made as to whether a hand-off to another system is requested. If so, the yes branch is taken to the block 242. Otherwise, the no branch is taken to the block 252.

Thus, a mobile terminal constructed to be operable pursuant to one air interface standard is able to communicate with a base station constructed to be operable pursuant to another, and incompatible, air interface standard.

Figure 9:
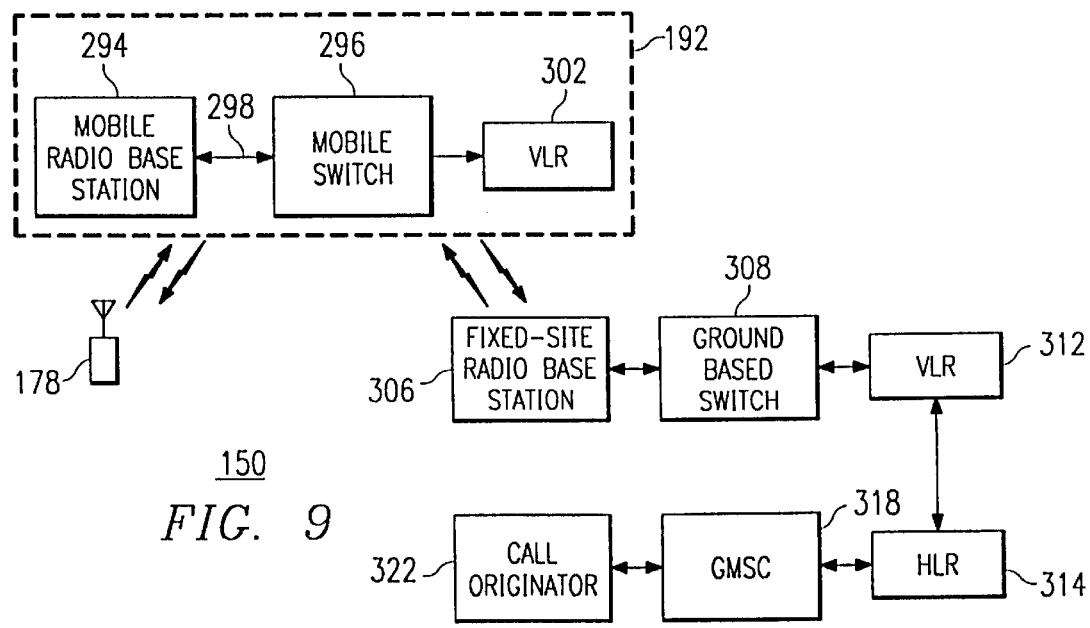
FIG. 9 illustrates a functional block diagram of a communication system in which an embodiment of the present invention is operative.

FIG. 9 illustrates portions of the communication system 150 shown previously in FIG. 6. The manner by which a subscriber unit 178 positioned upon the train 182 to travel together therewith registers itself at its HLR (home location register) permits a call that is to be terminated at the subscriber unit 178 to be routed thereto. While the following description of the exemplary embodiment shall be with respect to implementation of the circuitry 192 on the train 182, it should be understood that such circuitry can similarly be positioned elsewhere, such as on an airplane, for example.

Here, the circuitry 192 is shown to include a mobile radio base station 294 and a mobile switch 204 coupled together by way of the lines 298. The mobile radio base station 294 includes the functionality of the transceivers 194 and 196 (shown in FIG. 6). The functionality of the converter 198 (shown in FIG. 6) and the functionality of the determiner 202 (also shown in FIG. 6) are embodied in the mobile switch 204. In another embodiment, the functionality of such elements is distributed between the switch 204 and fixed-site elements.

The mobile radio base station 294 defines a single cell on the train 182 and is operable to transceive communication signals with subscriber units operable pursuant to a selected number of air interface standards. The cell defined by the base station 294 may, for instance, form a multi-standard cell or cells defined by different air interface standards. In the exemplary embodiment, the cell defined by the base station 294 provides a selected number of non-overlapping channels for each of the air interface standards pursuant to which the base station 294 is operable. And, a separate control channel is defined for each of the air interface standards pursuant to which the base station is operable. In an embodiment in which the circuitry 192 is mounted at an airplane, a single cell is defined upon the airplane by the base station 294. The subscriber units may, in such an embodiment, be coupled by way of a coaxial connector to the base station 294.

When the subscriber unit 178 is powered-on, the subscriber unit tunes to a control channel that it recognizes, in conventional fashion, and initiates, also in conventional fashion, updating of the location of the subscriber unit.

The mobile radio base station 294 recognizes the location updating initiated by the subscriber unit and forwards on the location information to the mobile switch 204 utilizing the protocol dictated by the air interface standard pursuant to which the subscriber unit is operable.

Associated with the mobile switch 204 is a VLR (visited location register) 206. The VLR 206 forms a database containing information regarding the subscriber units located in the area encompassed by the mobile switch 204, here the cell defined by the mobile radio base station 294 upon the train 182. The VLR 206 is updated with an update of the location of the subscriber unit 178. The VLR 206 is operable to store information in manners analogous to manners by which information pertaining to a roaming subscriber unit is stored in a conventional, cellular communication system.

Indications of the location of the subscriber unit 178 are also provided to a fixed-site base station 306. Such indications are provided pursuant to the air interface standard in which the fixed-site base station is operable. The base station 306 shown in FIG. 9 corresponds to one of the base stations 152 or 154 shown in FIG. 6. And, in turn, the switch 308 is provided with the location update of the subscriber unit. The ground-based switch 308 shown in FIG. 9 corresponds to one of the MSCs 158 and 166 shown in FIG. 6. The ground-based switch 308 further has a VLR (visited location register) 312 associated therewith. The location update of the subscriber unit 178 is further stored at the VLR 312. An indication of the protocol, viz., the air interface standard pursuant to which the subscriber unit 178 is operable, is also stored at the VLR 312.

The ground-based switch 308 forwards a location updating of the location of the subscriber unit 178 to an HLR (home location register) 314 associated with the subscriber unit 178. Such location updating utilizes the corresponding protocol to the "mobile network" to which the subscriber unit belongs. To address the signal, the number of the subscriber unit is used as a global title.

In another embodiment, the VLR 312 includes a map permitting mapping of the subscriber number of the subscriber unit 178, or protocol type, to signaling address information. And, once mapped, the signal is routed to the HLR.

The HLR 314 is coupled to the VLR 312 of the ground-based switch 308 in conventional fashion to receive the location update of the location of the subscriber unit 178. The address of the ground-based switch 308-VLR 312 is stored at the HLR 314. The subscriber unit 178 is further authenticated, in conventional manner, at the HLR 314, and information related to the subscriber unit 178 is returned to the VLR 312. Such information is stored at the VLR 312. Such information is further provided to the ground-based switch 308 which transmits the information to the mobile switch 204 and the VLR 206 associated therewith. Such information, as appropriate, is also stored at the VLR 206. Communication services and features to which the subscriber unit 178 is subscribed are thereafter available to the subscriber unit.

The functionality of the converter 198 (shown in FIG. 6) distributed between the mobile radio base station 294 and the mobile switch 204 is provided by protocol stacks for all types of air-interface protocols pursuant to which a subscriber unit positioned on the train 182 might be operable. And, the switch 204 and the ground-based switch 308 include protocol stacks for all types of intersystem protocols.

FIG. 9 further illustrates a GMSC (gateway mobile switching center) 318, coupled to the switch 308 by way of a PSTN (public-switched telephone network) 320, and a call originator 322 from which a call to be terminated at the subscriber unit 178 is generated. The call originator 322 is coupled to the GMSC 318 in a conventional manner. A call request is generated by the call originator 322 and forwarded to the GMSC 318. The GMSC 318 routes the inquiry to the HLR 314 of the terminating subscriber unit 178. Once the HLR 314 has been updated with the location of the subscriber unit 178, the HLR 314 routes the inquiry to the VLR 312. The VLR 312, in turn, returns a routing number by which the call can be routed to the subscriber unit 178. The call is then routed through the GMSC 318, PSTN 320, and switch 308, and, then, the switch 204 to the subscriber unit 178.

Figure 10:
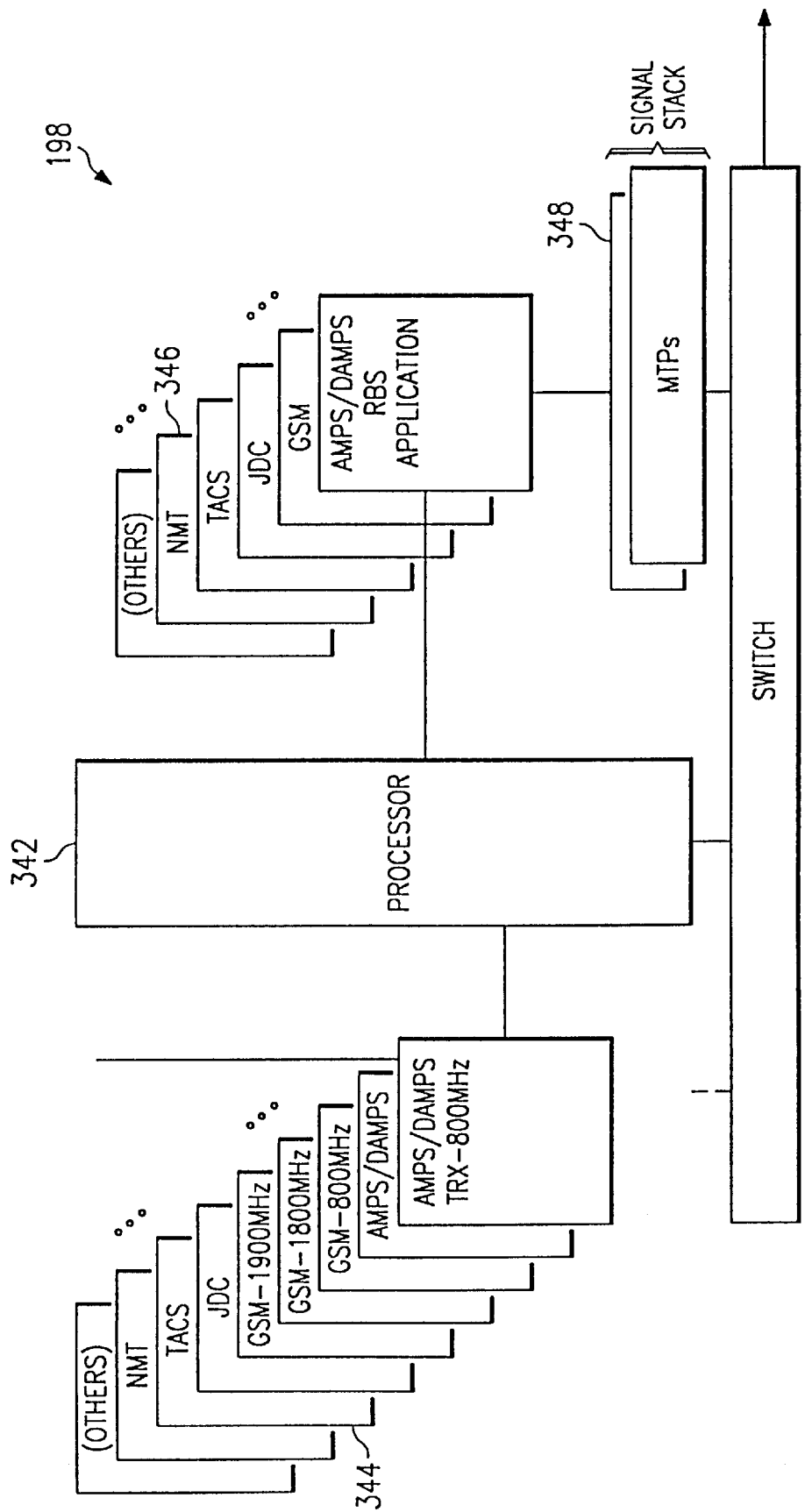
FIG. 10 illustrates a functional block diagram of a portion of the communication system shown in FIG. 9.

FIG. 10 illustrates the logical system architecture of the mobile radio base station 294. The local transceiver 196 transceives the local transceive signals with the subscriber units 178. The local transceiver is coupled to the converter 198, here shown to include a processor 342 through which a plurality of software stacks 344 and 346 are executable. Signaling stacks 348 are formed which are provided to the switch.

Figure 11:
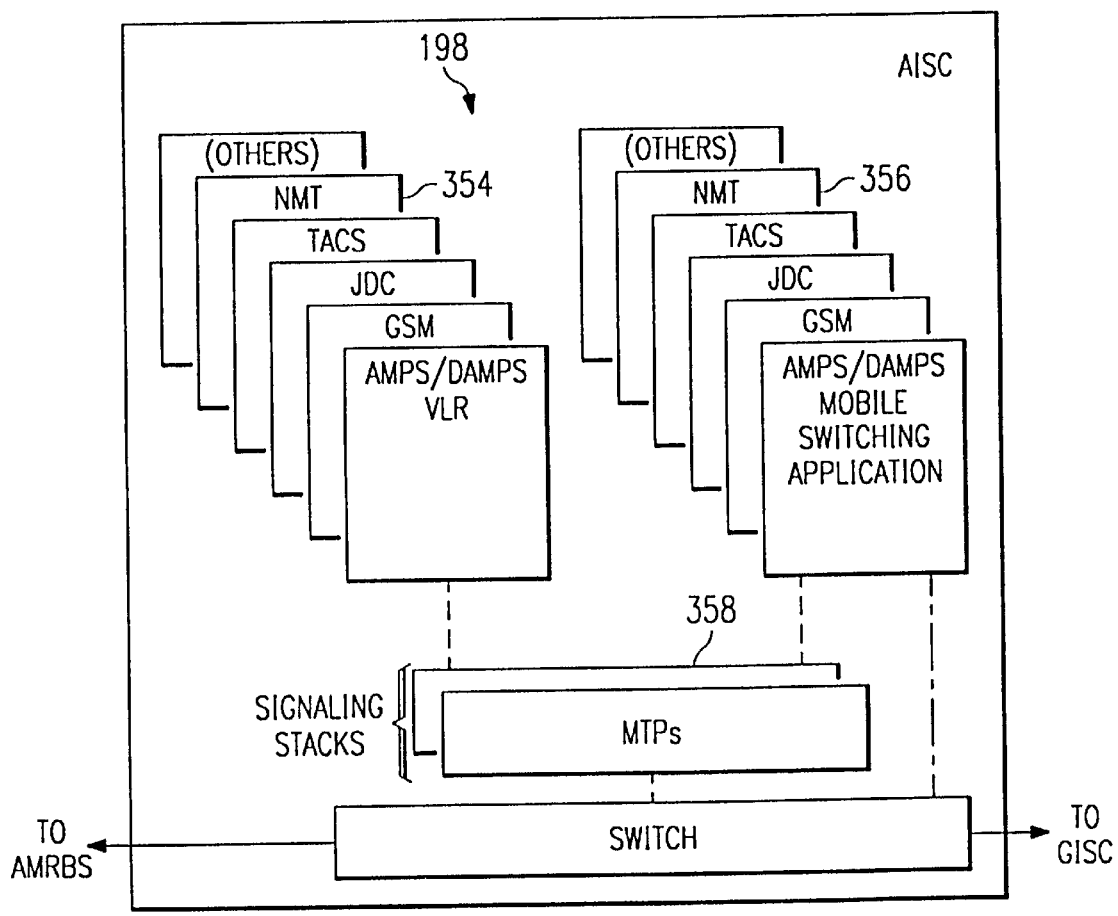
FIG. 11 illustrates a functional block diagram of the communication system shown in FIG. 9.

FIG. 11 illustrates the logical architecture of the functionality of a portion of the converter 198. Again, a plurality of protocol stacks, here the protocol stacks 354 and 356 which form signaling stacks 358 are formed thereat. Signals generated by a subscriber unit 178 are converted by the software stacks resident at the base station 294 and the switch 204 and are forwarded to the ground-based switch 308, as described previously.

The previous description are of preferred examples for implementing the invention, and the scope of the invention should not necessarily be limited to this description. The scope of the present invention is defined by the following claims.

What is claimed is:

1. Communication circuitry for controlling communications between at least one mobile transceiver unit operable pursuant to a selected air interface standard and wireless communication network infrastructure having at least one first-system fixed-site transceiver unit operable pursuant to a first air interface standard and at least one second-system fixed-site transceiver unit operable pursuant to a second air interface standard, each of the at least one mobile transceiver unit positioned to move together at a substantially similar velocity during a substantially similar time period, said communication circuitry comprising:

a local transceiver positioned to move together with the at least one mobile transceiver unit, said local transceiver for transceiving local transceive signals with the at least one mobile transceiver unit pursuant to the selected air interface standard;

a macro-system transceiver positioned to move together with the at least one mobile transceiver unit, said macro-system transceiver for transceiving macro-system transceiver signals with the first-system fixed-site transceiver unit and with the second-system fixed-site transceiver unit pursuant to the first and second air interface standards, respectively; and a converter coupled to said local transceiver and to said macro-system transceiver, said converter for selectively converting between the local transceive signals and the macro-system transceive signals such that: (1) local transceive signals, communicated by the local transceiver to the at least one mobile transceiver unit in response to macro-system transceive signals received by the macro-system transceiver from one of said fixed-site transceiver units pursuant to the associated air interface standard, are communicated pursuant to the selected air interface standard; and (2) macro-system transceive signals, communicated by the macro-system transceiver to a respective one of the fixed-site transceiver units in response to local transceive signals received by said local transceiver from said at least one mobile transceiver unit pursuant to the selected air interface standard, are communicated pursuant to the corresponding one of said first and second air interface standards.

2. The communication circuitry of claim 1 wherein the local transceive signals comprise local uplink signals communicated by the at least one mobile transceiver unit to said local transceiver and local downlink signals communicated by said local transceiver to the at least one mobile transceiver unit and wherein said converter converts the local uplink signals formed pursuant to the selected air interface standard into macro-system transceive signals formed pursuant to the first air interface standard when communications are to be effectuated between the at least one mobile transceiver unit and the first-system fixed-site transceiver unit of the wireless communication network infrastructure and the selected air interface standard is other than the first air interface standard.

3. The communication circuitry of claim 1 wherein the local transceive signals comprise local uplink signals communicated by the at least one mobile transceiver unit to said local transceiver and local downlink signals communicated by said local transceiver to the at least one mobile transceiver unit and wherein said converter converts the local uplink signals formed pursuant to the selected air interface standard into macro-system transceive signals formed pursuant to the second air interface standard when communications are to be effectuated between the at least one mobile transceiver unit and the second-system fixed-site transceiver unit of the wireless communication network infrastructure and the selected air interface standard is other than the second air interface standard.

4. The communication circuitry of claim 1 wherein the macro-system transceive signals comprise macro-system uplink signals communicated by said macro-system transceiver to the first-system fixed-site transceiver unit and macro-system downlink signals communicated by the first-system fixed-site transceiver unit to said macro-system transceiver and wherein said converter converts the macro-system downlink signals formed pursuant to the first air interface standard into local transceive signals formed pursuant to the selected air interface standard when communications are to be effectuated between the at least one mobile transceiver unit and the first-system fixed-site transceiver unit of the wireless communication network infrastructure and the selected air interface standard is other than the first air interface standard.

5. The communication circuitry of claim 1 wherein the macro-system transceive signals comprise macro-system uplink signals communicated by said macro-system transceiver to the second-system fixed-site transceiver unit and macro-system downlink signals communicated by the second-system fixed-site transceiver unit to said macro-system transceiver and wherein said converter converts the macro-system downlink signals formed pursuant to the second air interface standard into local transceive signals formed pursuant to the selected air interface standard when communications are to be effectuated between the at least one mobile transceiver unit and the second-system fixed-site transceiver unit of the wireless communication network infrastructure and the selected air interface standard is other than the second air interface standard.

6. Communication circuitry for controlling communications between at least one mobile transceiver unit operable pursuant to a selected air interface standard and wireless communication network infrastructure having at least one first-system fixed-site transceiver unit operable pursuant to a first air interface standard and at least one second-system fixed-site transceiver unit operable pursuant to a second air interface standard, each of the at least one mobile transceiver unit positioned to move together at a substantially similar velocity during a substantially similar time period, said commuciation circuitry comprising:

a local transceiver positioned to move together with the at least one mobile transceiver unit, said local transceiver for transceiving local transceive signals with the at least one mobile transceiver unit;

a macro-system transceiver positioned to move together with the at least one mobile transceiver unit, said macro-system transceiver for transceiving macro-system transceiver signals with a selected one of the first-system fixed-site transceiver unit and the second-system fixed-site transceiver unit;

a converter coupled to said local transceiver and to said macro-system transceiver, said converter for selectively converting the local transceive signals and the macro-system transceive signals such that the local transceive signals communicated by the local transceiver to the at least one mobile transceiver unit are communicated pursuant to the selected air interface standard and the macro-system transceive signals communicated by the macro-system transceiver to a respective one of the first-system fixed-site transceiver unit and the second-system fixed-site transceiver unit are communicated pursuant to a respective one of the first air interface standard and the second air interface standard;

wherein the wireless communication network infrastructure further communicates infrastructure-generated control signals to said local transceiver, said local transceiver tunable to receive the infrastructure-generated control signals transmitted thereto; and a determiner coupled to receive indications of the infrastructure-generated control signals received by said local transceiver, said determiner for determining between which of the at least one first-system fixed-site transceiver unit and the at least one second-system fixed-site transceiver unit communications with the at least one mobile transceiver unit are best able to be effectuated and for generating fixed-site allocation request signals responsive thereto.

7. The communication circuitry of claim 6 wherein said macro-system transceiver is further coupled to receive the fixed-site allocation request signals generated by said determiner and for transmitting the fixed-site allocation request signals to the wireless communication network infrastructure requesting allocation of at least one of the first-system fixed-site transceiver unit and the second-system fixed-site unit through which to effectuate communications between the at least one mobile transceiver unit and the wireless communication network infrastructure.

8. The communication circuitry of claim 6 wherein said determiner is positioned to move together with the at least one mobile transceiver unit.

9. The communication circuitry of claim 1 wherein said at least one mobile transceiver unit comprises a plurality of mobile transceiver units, each operable to a selected air interface standard, and wherein said converter converts the local transceive signals, each formed of a selected air interface standard, communicated by the plurality of mobile transceiver units into macro-system transceive signals, all of the macro-system transceive signals being formed pursuant to one of the first air interface standard and the second air interface standard.

10. Communication circuitry for controlling communications between at least one mobile transceiver unit operable pursuant to a selected air interface standard and wireless communication network infrastructure having at least one first-system fixed-site transceiver unit operable pursuant to a first air interface standard and at least one second-system fixed-site transceiver unit operable pursuant to a second air interface standard, each of the at least one mobile transceiver unit positioned to move together at a substantially similar velocity during a substantially similar time period, said communication circuitry comprising:

a local transceiver positioned to move together with the at least one mobile transceiver unit, said local transceiver for transceiving local transceive signals with the at least one mobile transceiver unit;

a macro-system transceiver positioned to move together with the at least one mobile transceiver unit, said macro-system transceiver for transceiving macro-system transceiver signals with a selected one of the first-system fixed-site transceiver unit and the second-system fixed-site transceiver unit;

a converter coupled to said local transceiver and to said macro-system transceiver, said converter for selectively converting the local transceive signals and the macro-system transceive signals such that the local transceive signals communicated by the local transceiver to the at least one mobile transceiver unit are communicated pursuant to the selected air interface standard and the macro-system transceive signals communicated by the macro-system transceiver to a respective one of the first-system fixed-site transceiver unit and the second-system fixed-site transceiver unit are communicated pursuant to a respective one of the first air interface standard and the second air interface standard;

wherein said at least one mobile transceiver unit comprises a plurality of mobile transceiver units, each operable pursuant to a selected air interface standard, and wherein said converter converts the local transceive signals, each formed of a selected air interface standard, communicated by the plurality of mobile transceiver units into macro-system transceive signals, all of the macro-system transceive signals being formed pursuant to one of the first air interface standard and the second air interface standard; and wherein said plurality of mobile transceiver units comprise a first mobile transceiver unit operable pursuant to a first selected air interface standard and at least a second mobile transceiver unit operable pursuant to a second selected air interface standard, and wherein said converter converts local transceive signals generated by the first and at least second, respectively, mobile transceiver units into macro-system transceive signals, all of the macro-system transceive signals being formed pursuant to one of the first air interface standard and the second air interface standard.

11. Communication circuitry for controlling communications between at least one mobile transceiver unit operable pursuant to a selected air interface standard and wireless communication network infrastructure having at least one first-system fixed-site transceiver unit operable pursuant to a first air interface standard and at least one second-system fixed-site transceiver unit operable pursuant to a second air interface standard, each of the at least one mobile transceiver unit positioned to move together at a substantially similar velocity during a substantially similar time period, said communication circuitry comprising:

a local transceiver positioned to move together with the at least one mobile transceiver unit, said local transceiver for transceiving local transceive signals with the at least one mobile transceiver unit;

a macro-system transceiver positioned to move together with the at least one mobile transceiver unit, said macro-system transceiver for transceiving macro-system transceiver signals with a selected one of the first-system fixed-site transceiver unit and the second-system fixed-site transceiver unit;

a converter coupled to said local transceiver and to said macro-system transceiver, said converter for selectively converting the local transceive signals and the macro-system transceive signals such that the local transceive signals communicated by the local transceiver to the at least one mobile transceiver unit are communicated pursuant to the selected air interface standard and the macro-system transceive signals communicated by the macro-system transceiver to a respective one of the first-system fixed-site transceiver unit and the second-system fixed-site transceiver unit are communicated pursuant to a respective one of the first air interface standard and the second air interface standard; and wherein each of the at least one mobile transceiver unit comprises a cellular subscriber unit, wherein the at least one first-system fixed-site transceiver unit and the at least one second-system fixed-site transceiver unit comprise fixed-site base stations of a first cellular network and a second cellular network, respectively, and wherein said local transceiver, said macro-system transceiver, and said converter together form a mobile base station positioned to move together with movement of the at least one cellular subscriber unit.

12. The communication circuitry of claim 11 wherein the at least one cellular subscriber unit comprises a plurality of cellular subscriber units, each of the plurality of the cellular subscriber units are positioned at a movable platform assembly to move together therewith, and wherein said mobile base station is positioned at the movable platform assembly, also to move together therewith.

13. Communication circuitry for controlling communications between at least one mobile transceiver unit operable pursuant to a selected air interface standard and wireless communication network infrastructure having at least one first-system fixed-site transceiver unit operable pursuant to a first air interface standard and at least one second-system fixed-site transceiver unit operable pursuant to a second air interface standard, each of the at least one mobile transceiver unit positioned to move together at a substantially similar velocity during a substantially similar time period, said communication circuitry comprising:

a local transceiver positioned to move together with the at least one mobile transceiver unit, said local transceiver for transceiving local transceive signals with the at least one mobile transceiver unit;

a macro-system transceiver positioned to move together with the at least one mobile transceiver unit, said macro-system transceiver for transceiving macro-system transceiver signals with a selected one of the first-system fixed-site transceiver unit and the second-system fixed-site transceiver unit;

a converter coupled to said local transceiver and to said macro-system transceiver, said converter for selectively converting the local transceive signals and the macro-system transceive signals such that the local transceive signals communicated by the local transceiver to the at least one mobile transceiver unit are communicated pursuant to the selected air interface standard and the macro-system transceive signals communicated by the macro-system transceiver to a respective one of the first-system fixed-site transceiver unit and the second-system fixed-site transceiver unit are communicated pursuant to a respective one of the first air interface standard and the second air interface standard; and a location register coupled to receive indications of the selected air interface standard pursuant to which the at least one mobile transceiver unit is operable.

14. A method for controlling communications between at least one mobile transceiver unit operable pursuant to a selected air interface standard and wireless communication network infrastructure having at least one first-system fixed-site transceiver unit operable pursuant to a first air interface standard and at least one second-system fixed-site transceiver unit operable pursuant to a second air interface standard, each of the at least one mobile transceiver unit positioned to move together at a substantially similar velocity during a substantially similar time period, said method comprising the steps of:

transceiving local transceive signals with the at least one mobile terminal and a local transceiver positioned to move together with the at least one mobile transceiver unit;

transceiving macro-system transceive signals with a selected one of the first-system fixed-site transceiver unit and the second-system fixed-site transceiver unit and a macro-system transceiver positioned to move together with the at least one mobile transceiver unit; and selectively converting the local transceive signals and the macro-system transceive signals such that the local transceive signals communicated by the local transceiver to the at least one mobile transceiver unit are communicated pursuant to the selected air interface standard and the macro-system transceive signals communicated by the macro-system transceiver to a respective one of the first-system fixed-site transceiver unit and the second-system fixed-site transceiver unit are communicated pursuant to a respective one of the first air interface standard and the second air interface standard.

15. The method of claim 14 comprising the further step of determining between which of the first-system fixed-site transceiver unit and the second-system fixed-site transceiver unit of the wireless communication network infrastructure and the at least one mobile transceiver unit communications are best able to be effectuated.

* * * * *

UNITED STATES PATENT AND TRADEMARK OFFICE
CERTIFICATE OF CORRECTION

PATENT NO.    : 5,970,408
DATED         : October 19, 1999
INVENTOR(S)   : Carlsson et al.

It is certified that error appears in the above-identified patent and that said Letters Patent is hereby corrected as shown below:

Column 4,
Line 23, replace "ongoing" with -- on-going --

Column 19,
Line 9, replace "communciation" with -- communication --

Signed and Sealed this

Twenty-fifth Day of December, 2001

*Attest:*

*Attesting Officer*

JAMES E. ROGAN
*Director of the United States Patent and Trademark Office*